US008411285B2

(12) United States Patent
Sharp

(10) Patent No.: US 8,411,285 B2
(45) Date of Patent: Apr. 2, 2013

(54) STATIONING AN UNLEVELED OPTICAL TOTAL STATION

(75) Inventor: Kevin Sharp, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 301 days.

(21) Appl. No.: 12/952,007

(22) Filed: Nov. 22, 2010

(65) Prior Publication Data

US 2012/0127455 A1    May 24, 2012

(51) Int. Cl.
*G01B 11/14* (2006.01)
*G01C 3/08* (2006.01)

(52) U.S. Cl. .................. 356/614; 356/4.01; 356/139.01; 701/300; 33/292

(58) Field of Classification Search .......... 356/514–623, 356/4.01, 4.07, 141.1, 152.3, 139.01; 701/300; 33/292; 382/103
See application file for complete search history.

(56) References Cited

U.S. PATENT DOCUMENTS

| | | | |
|---|---|---|---|
| 4,172,661 A * | 10/1979 | Marcus et al. | 356/4.01 |
| 5,077,557 A | 12/1991 | Ingensand | |
| 5,233,357 A | 8/1993 | Ingensand et al. | |
| 5,512,905 A | 4/1996 | Nichols et al. | |
| 6,014,109 A | 1/2000 | Raby | |
| 6,034,722 A | 3/2000 | Viney et al. | |
| 6,359,585 B1 | 3/2002 | Bechman et al. | |
| 7,697,127 B2 | 4/2010 | Vogel et al. | |
| 2007/0019212 A1 * | 1/2007 | Gatsios et al. | 356/614 |
| 2009/0245653 A1 * | 10/2009 | Kochi et al. | 382/203 |
| 2010/0095539 A1 * | 4/2010 | Nakaniwa | 33/284 |
| 2010/0123892 A1 * | 5/2010 | Miller et al. | 356/4.01 |
| 2010/0303300 A1 * | 12/2010 | Svanholm | 382/106 |
| 2010/0309311 A1 * | 12/2010 | Svanholm | 348/135 |
| 2011/0001986 A1 * | 1/2011 | Westermark | 356/615 |
| 2011/0066375 A1 * | 3/2011 | France et al. | 701/213 |
| 2011/0178758 A1 * | 7/2011 | Atwell et al. | 702/134 |
| 2012/0186088 A1 * | 7/2012 | Amor | 33/228 |
| 2012/0262728 A1 * | 10/2012 | Bridges et al. | 356/614 |

OTHER PUBLICATIONS

Webpage of Johann Borenstein downloaded from http://www-personal.umich.edu/~johannb/; downloaded on Mar. 1, 2011; 3 pages.
"Trimble GX 3D Scanner for Spatial Imaging-Accurate Terrestrial Positioning Data for the Geospatial Industry," downloaded from http://www.trimble.com/trimblegx.shtml, downloaded on Mar. 1, 2011, 1 page.
"2007 DARPA Urban Challenge, " downloaded from http://cs.stanford.edu/group/roadrunner/, downloaded on Mar. 1,2011, 1 page.
"MIT City Scanning Project: Fully Automated Model Acquisition in Urban Areas, " downloaded from http://city.csail.mit.edu/, downloaded on Mar. 1, 2011, 13 pages.
Borenstein et al., "Where am I ?" Sensors and Methods for Mobile Robot Positioning, University of Michigan, Apr. 1996, 282 pages.

* cited by examiner

*Primary Examiner* — Hoa Pham
(74) *Attorney, Agent, or Firm* — Kilpatrick Townsend & Stockton LLP

(57) ABSTRACT

A method of stationing an unleveled optical total station includes placing the unleveled optical total station at a first station. At the first station, positions of at least three non-collinear measurement points in an instrument coordinate system are determined using the unleveled optical total station. The method also includes obtaining positions of the at least three non-collinear measurement points in a local coordinate system. A transformation is computed between the instrument coordinate system and the local coordinate system using the positions of the at least three non-collinear measurement points in the instrument coordinate system and the positions of the at least three non-collinear measurement points in the local coordinate system.

21 Claims, 14 Drawing Sheets

STATIONING AN UNLEVELED OPTICAL TOTAL STATION

BACKGROUND

The present invention relates generally to survey operations. More particularly, the present invention relates to methods of stationing an unleveled optical total station.

An initial step in using an optical total station for survey operations typically involves determining a position of the optical total station in a local or real world coordinate system. The position typically includes a location and a rotation about x, y, and z axes. This set-up process is commonly referred to as stationing. Using the position of the optical total station in the local coordinate system, measurements that are obtained using the optical total station in an instrument coordinate frame can be transformed to positions in the local coordinate system.

To determine the location of the optical total station in the local coordinate system, stationing typically involves placing the optical total station at a known height above a survey monument or other selected point having known coordinates in the local coordinate system. To determine the rotation of the optical total station about the x and y axes, stationing typically involves leveling or aligning a vertical axis of the optical total station with the local gravity vector. To determine the rotation of the optical total station about the z axis, stationing typically involves sighting to a point having known coordinates in the local coordinate system.

While stationing is a well-known and accepted practice in surveying, it is time consuming and subject to errors. Thus, there is a general need in the art for improved methods of stationing an optical total station.

SUMMARY

Embodiments of the present invention provide improved methods of stationing an unleveled optical total station. An unleveled optical total station is one that may be at an unknown location in the local coordinate system and/or may have an unknown rotation about x, y, and/or z axes. Stationing an unleveled optical total station refers to methods of using the unleveled optical total station such that measurements obtained in an instrument coordinate system (e.g., a coordinate frame of the unleveled optical total station) can be transformed to positions or coordinates in the local coordinate system. As an example, one embodiment of the invention includes measuring positions of target points and control points using an unleveled optical total station. A target point may be a reference point at an unknown position in the local coordinate system, and a control point may be a reference point at a known position in the local coordinate system. Using the measurements of the target points and the control points, a transformation can be determined between the instrument coordinate system and the local coordinate system. Using the transformation, positions or coordinates of other points measured using the unleveled optical total station can be determined in the local coordinate system.

In accordance with an embodiment of the invention, a method of stationing an unleveled optical total station includes placing the unleveled optical total station at a first station. At the first station, positions of at least three non-collinear measurement points are determined in an instrument coordinate system using the unleveled optical total station. The method also includes obtaining positions of the at least three non-collinear measurement points in a local coordinate system, and computing a transformation between the instrument coordinate system and the local coordinate system using the positions of the at least three non-collinear measurement points in the instrument coordinate system and the positions of the at least three non-collinear measurement points in the local coordinate system.

In accordance with another embodiment of the invention, a method of stationing an unleveled optical total station includes placing the unleveled optical total station at a first station. At the first station, positions of three or more target points in a first instrument coordinate system are determined using the unleveled optical total station. At least three of the three or more target points are non-collinear. The method also includes placing the unleveled optical total station at one or more additional stations. At each of the one or more additional stations, positions of at least three non-collinear target points of the three or more target points are determined in a respective one of one or more additional instrument coordinate systems using the unleveled optical total station. The method also includes computing transformations such that the positions of the at least three non-collinear target points in each of the one or more additional instrument coordinate systems can be determined in the first instrument coordinate system. The method also includes determining positions of at least three non-collinear control points, a position of at least one of the at least three non-collinear control points being determined in the first instrument coordinate system, and a position of at least one of the at least three non-collinear control points being determined in the one or more additional instrument coordinate systems. The method also includes determining the positions of the at least three non-collinear control points in the first instrument coordinate system using the transformations, and obtaining positions of the at least three non-collinear control points in the local coordinate system. The method also includes computing a second transformation between the first instrument coordinate system and the local coordinate system using the positions of the at least three non-collinear control points in the first instrument coordinate system and the positions of the at least three non-collinear control points in the local coordinate system.

In accordance with another embodiment of the invention, a method of stationing an unleveled optical total station includes determining positions of three or more non-collinear target points at each of a plurality of measurement stations using the unleveled optical total station. Each measurement station is associated with a respective instrument coordinate system. The three or more non-collinear target points at each measurement station are common with three or more non-collinear target points at another one of the plurality of measurement stations. The method also includes computing transformations such that the positions of the three or more non-collinear target points at each measurement station can be determined in a first one of the instrument coordinate systems. The method also includes determining positions of at least three non-collinear control points at one or more of the plurality of measurement stations, and determining the positions of the at least three non-collinear control points in the first one of the instrument coordinate systems using the transformations. The method also includes obtaining positions of the at least three non-collinear control points in the local coordinate system, and computing a second transformation between the first one of the instrument coordinate systems and the local coordinate system using the positions of the at least three non-collinear control points in the first one of the instrument coordinate systems and the positions of the at least three non-collinear control points in the local coordinate system.

Numerous benefits are achieved using embodiments of the present invention over conventional techniques. For example, some embodiments allow survey operations to be performed without having to perform conventional stationing procedures. For example, survey operations can be performed without knowing a position of the unleveled optical total station in the local coordinate system. This can reduce set-up time and simplify survey operations. Also, some embodiments allow survey operations to be performed in situations where an instrument's position cannot be determined in a gravity referenced coordinate system, such as on an offshore semi-submersible or floating oil platform. In such applications, measurements made in an instrument coordinate system can be transformed to positions in a coordinate frame associated with the unstable environment (e.g., the oil platform). Depending upon the embodiment, one or more of these benefits may exist. These and other benefits are described throughout the specification and more particularly below.

DETAILED DESCRIPTION

Embodiments of the present invention provide methods of stationing an unleveled optical total station. The methods allow measurements that are obtained in an instrument coordinate system to be transformed to positions or coordinates in the local coordinate system. In one embodiment, for example, positions of measurement points having known coordinates in the local coordinate system are measured using an unleveled optical total station. A transformation between an instrument coordinate system and the local coordinate system can be determined using the measured positions in the instrument coordinate system and the known coordinates in the local coordinate system. Using the transformation, positions of additional points that are measured using the unleveled optical total station can be determined in the local coordinate system.

In another embodiment, positions of target points and control points are measured from a first station and one or more additional stations using an unleveled optical total station. A station may be a measurement location (e.g., a location of the unleveled optical total station from which measurements are obtained). A target point may be a reference point at an unknown position in the local coordinate system, and a control point may be a reference point at a known position in the local coordinate system. Each station is associated with an instrument coordinate system. Transformations between one or more instrument coordinate systems and the local coordinate system can be determined using the measured positions of the target and control points in the instrument coordinate systems and the known coordinates of the control points in the local coordinate system. Using the transformations, positions of additional points that are measured at the first station and/or at one or more of the additional stations can be determined in the local coordinate system. These and other embodiments are described more fully below.

Figure 1:
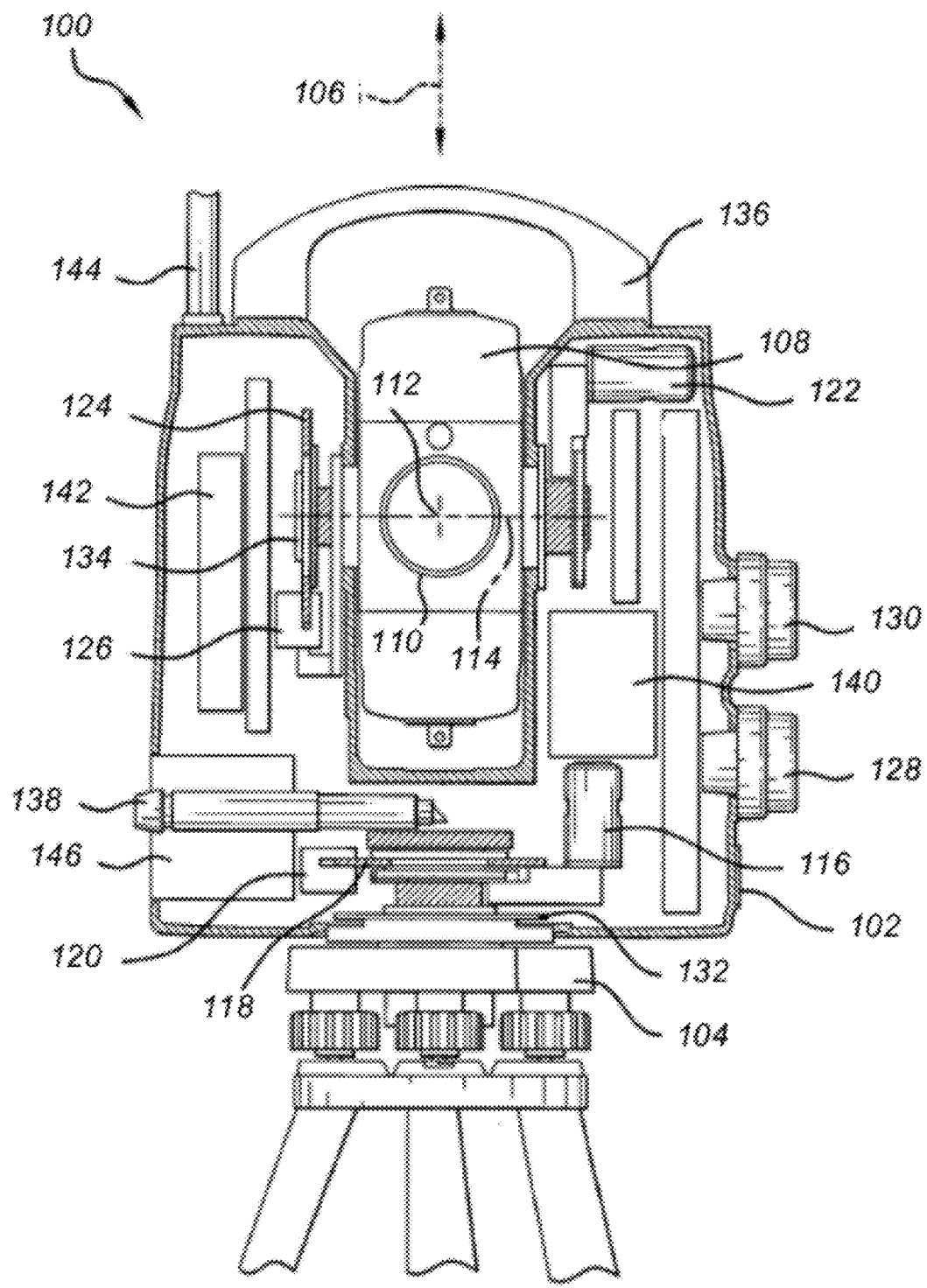
FIG. 1 is a simplified sectional view of an exemplary optical total station that may be used to implement some embodiments of the present invention.

FIG. 1 is a simplified partial sectional elevation view of an exemplary optical total station 100 that may be used to implement some of the embodiments of the present invention. Optical total station 100 is used herein merely as an example, and it is to be understood that embodiments of the present invention may be used with other optical total stations that may be configured differently and/or include components that are different from those illustrated in FIG. 1. Optical total station 100 has an alidade 102 mounted on an adjustable tribrach 104. Adjustable tribrach 104 is typically configured to allow rotation about a support axis 106. Support axis 106 is vertical and can be aligned with the local gravity vector by leveling alidade 102. A telescope unit 108 has a telescope 110 with an optical centerline (line of sight) 112. Telescope unit 108 may include a distance measurement module for measuring distance to a target remote from optical total station 100. Telescope unit 108 is typically mounted for rotation about an elevation axis 114. Elevation axis 114 is orthogonal to support axis 106.

A controllable horizontal drive 116 rotates alidade 102 about support axis 106 in response to control signals. Markings of a graduated ring 118 that is fixed with respect to tribrach 104 are detected by a horizontal angle sensor 120 as alidade 102 is rotated. A controllable vertical drive 122 rotates telescope unit 108 about elevation axis 114 in response to control signals. Markings of a graduated ring 124 that is fixed with respect to telescope unit 108 are detected by a vertical angle sensor 126 as telescope unit 108 is rotated. A horizontal control 128 with manually-operable knob and a vertical control 130 with manually-operable knob provide user inputs for control of horizontal drive 116 and vertical drive 122, respectively.

Alidade 102 is typically rotatable about support axis 106 to any desired angle and telescope unit 108 is typically rotatable about elevation axis 114 to any desired angle. This allows telescope 110 to be aimed at an arbitrarily-positioned external target. Slip rings 132 provide for transmission of power from an external power supply to alidade 102 and/or communication of data commands between alidade 102 and an external control unit. Slip rings 134 may also provide for transmission of power from alidade 102 to telescope unit 108 and/or communication of data and commands between alidade 102 and telescope unit 108.

A radio module 142 with an antenna 144 provides for communication of data and commands between optical total station 100 and an external radio control unit. A battery 146 is provided to supply electrical power for optical total station 100. Optical total station 100 may also have a removable control unit with a keypad and/or other input devices and a display screen.

Alidade 102 typically includes a handle 136 for easy transport. An optical plummet 138 is provided to facilitate manual positioning of optical total station 100 over a survey monument or other selected point. Optical plummet 138 may emit a light beam vertically downward that is coaxial with support axis 106 or allow viewing the selected point through a small telescope. An inclination detector 140 supplies a signal representing inclination of alidade 102 in two mutually-orthogonal directions and thus enables setting up the optical total station so that support axis 106 is plumb and elevation axis 114 is horizontal.

As would be appreciated by one of ordinary skill in the art, optical total station 100 is configured such that it can be positioned over a selected point having known coordinates in the local coordinate system using optical plummet 138. Optical total station 100 can also be leveled in the x and y axes using inclination detector 140 and oriented about the z axis by sighting to a point having known coordinates in the local coordinate system. These constraints allow positions of points that are measured using optical total station 100 to be determined in the local coordinate system. In some situations, however, it may be beneficial to not be bound by such constraints. As described more fully below, embodiments of the present invention provide methods of using an unleveled optical total station such that measurements obtained in an instrument coordinate system (e.g., a coordinate frame of the unleveled optical total station) can be transformed to positions or coordinates in the local coordinate system.

Figure 2A:
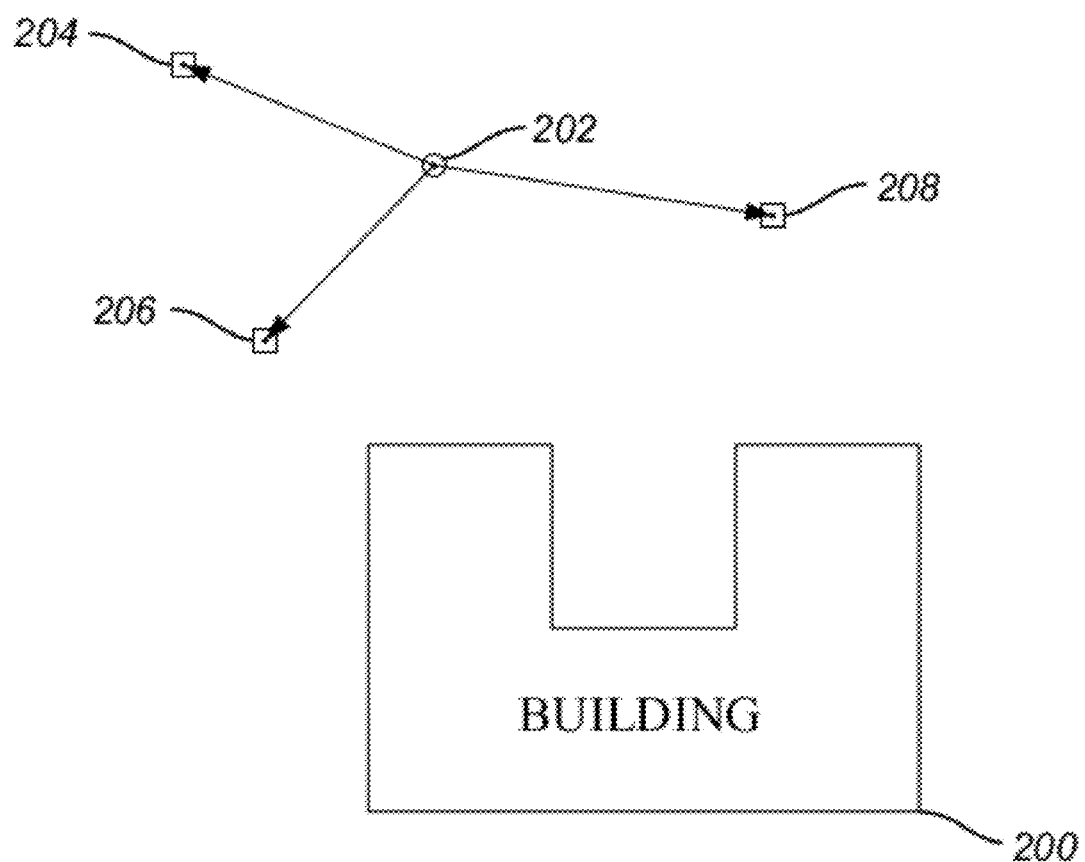
FIGS. 2A-2B are simplified plan views of a measurement site that illustrate an exemplary method of stationing an unleveled optical total station in accordance with an embodiment of the invention.
Figure 2B:
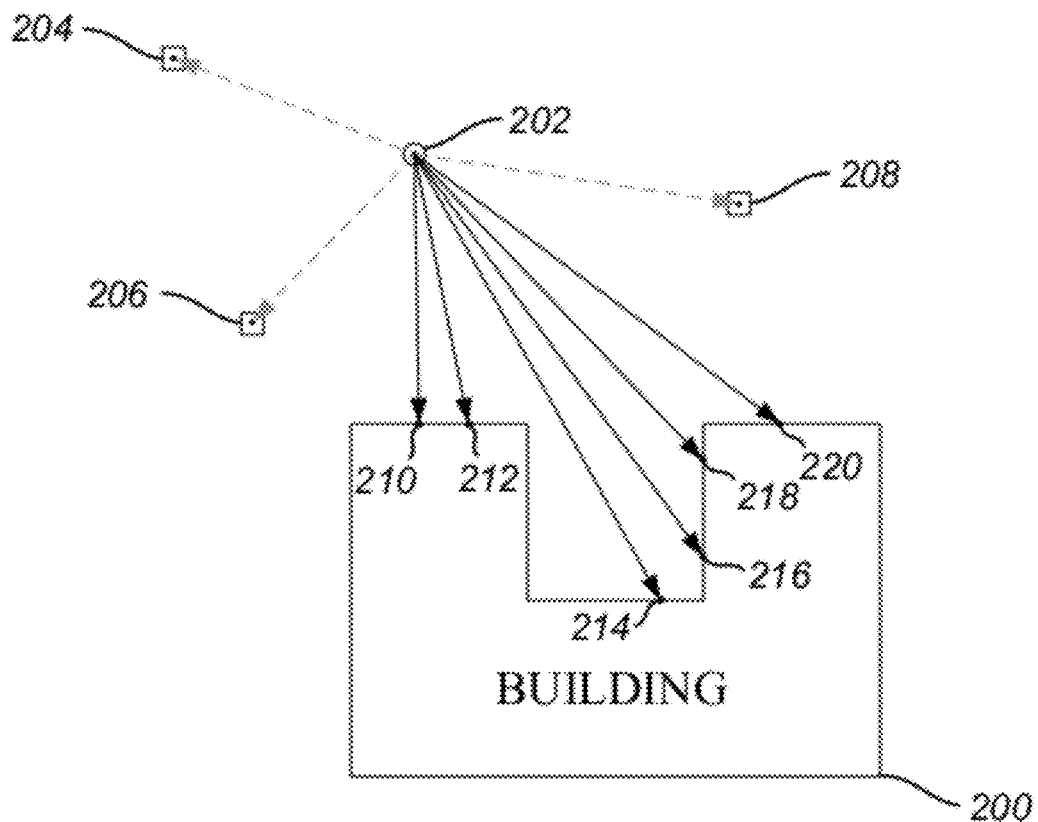

FIGS. 2A-2B are simplified plan views of a measurement site that illustrate an exemplary method of stationing an unleveled optical total station in accordance with an embodiment of the invention. FIG. 2A shows a plan view of a building 200, a measurement station 202, and measurement points 204, 206, 208. Merely for ease of explanation, measurement station 202 is represented by a circle, and measurement points 204, 206, 208 are represented by squares. In this example, positions of measurement points 204, 206, 208 are at known locations in the local coordinate system.

Measurement station 202 represents a position from which measurements are obtained using the unleveled optical total station. As an example, the position may be an origin of an instrument coordinate system that is at a center of rotation of the unleveled optical total station (e.g., at an intersection of support axis 106 and elevation axis 114 in FIG. 1). Without determining the position of measurement station 202 in the local coordinate system, the positions of measurement points 204, 206, 208 may be determined in the instrument coordinate system using the unleveled optical total station. The positions of measurement points 204, 206, 208 in the instrument coordinate system may each include an elevation or angle about a horizontal axis of the unleveled optical total station, a bearing or angle about a vertical axis of the unleveled optical total station, and/or a distance between the unleveled optical total station and each of the measurement points 204, 206, 208. The positions may be determined using known techniques that involve, for example, sighting through the telescope of the unleveled optical total station to each of measurement points 204, 206, 208 to measure rotation about horizontal and vertical axes and measuring distance using, for example, a distance measurement device such as an electronic distance measuring (EDM) unit. Determining the positions of measurement points 204, 206, 208 is illustrated in FIG. 2A by lines extending from measurement station 202 to each of the measurement points 204, 206, 208.

Using the positions of measurement points 204, 206, 208 in the instrument coordinate system and the known positions of measurement points 204, 206, 208 in the local coordinate system, a transformation between the instrument coordinate system and the local coordinate system can be determined in accordance with known techniques.

Using the transformation, positions of additional points that are measured using the unleveled optical total station can be determined in the local coordinate system. This is illustrated in FIG. 2B, where additional points 210, 212, 214, 216, 218, 220 on building 200 are measured from measurement station 202. The positions of these points are measured in the instrument coordinate system using the unleveled optical total station. Using the transformation, the positions of these points in the local coordinate system can be determined in accordance with known techniques.

Transformations between coordinate systems can be determined using positions of at least three non-collinear points having known positions (or coordinates) in each coordinate system. In the example illustrated in FIG. 2A, the positions of measurement points 204, 206, 208 are measured in the instrument coordinate system using the unleveled optical total station, and the positions of measurement points 204, 206, 208 are known in the local coordinate system.

In an alternative embodiment, a position of one of the at least three non-collinear points may be determined using other known techniques. For example, an origin of the instrument coordinate system, typically located at a center of rotation of the unleveled optical total station, may be positioned at a known height above a survey monument or other selected point having known coordinates in the local coordinate system. In this example, the position of the origin in the instrument coordinate system is known, and the position of the origin in the local coordinate system can be determined using the known coordinates of the selected point in the local coordinate system and the known height above the point (e.g., the height along a vertical axis in the local coordinate system). In this example, the position of the origin can be used as one of the at least three non-collinear points that are used to determine the transformation between the instrument coordinate system and the local coordinate system. As would be appreciated by one of ordinary skill in the art, the position of the origin may also be used in addition to the at least three non-collinear points to improve accuracy of the transformation.

As another example, a position measurement device, such as a global navigation satellite system (GNSS), may be rigidly attached to the unleveled optical total station (or to a telescope of the unleveled optical total station). Here, rigidly attached infers that an antenna phase center of the GNSS is arranged at a known offset from the origin of the instrument coordinate system. In this example, the position of the antenna phase center is measured in the local coordinate system using conventional position measurement techniques, and the antenna phase center is at a known position (e.g., at a known offset from the origin) in the instrument coordinate system. In this example, the position of the antenna phase center can be used as one of the at least three non-collinear points that are used to determine the transformation between the instrument coordinate system and the local coordinate system. The position of the antenna phase center may also be used in addition to the at least three non-collinear points to improve accuracy of the transformation.

Figure 3A:
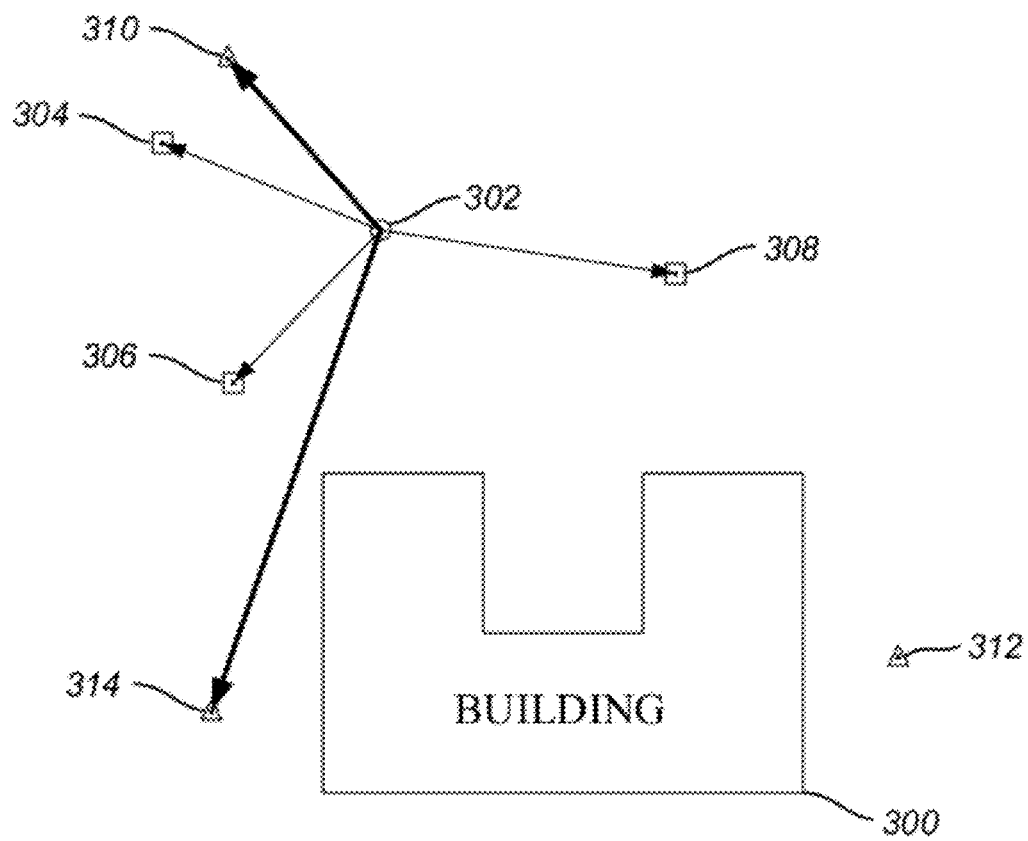
FIGS. 3A-3C are simplified plan views of a measurement site that illustrate an exemplary method of stationing an unleveled optical total station in accordance with another embodiment of the invention.
Figure 3B:
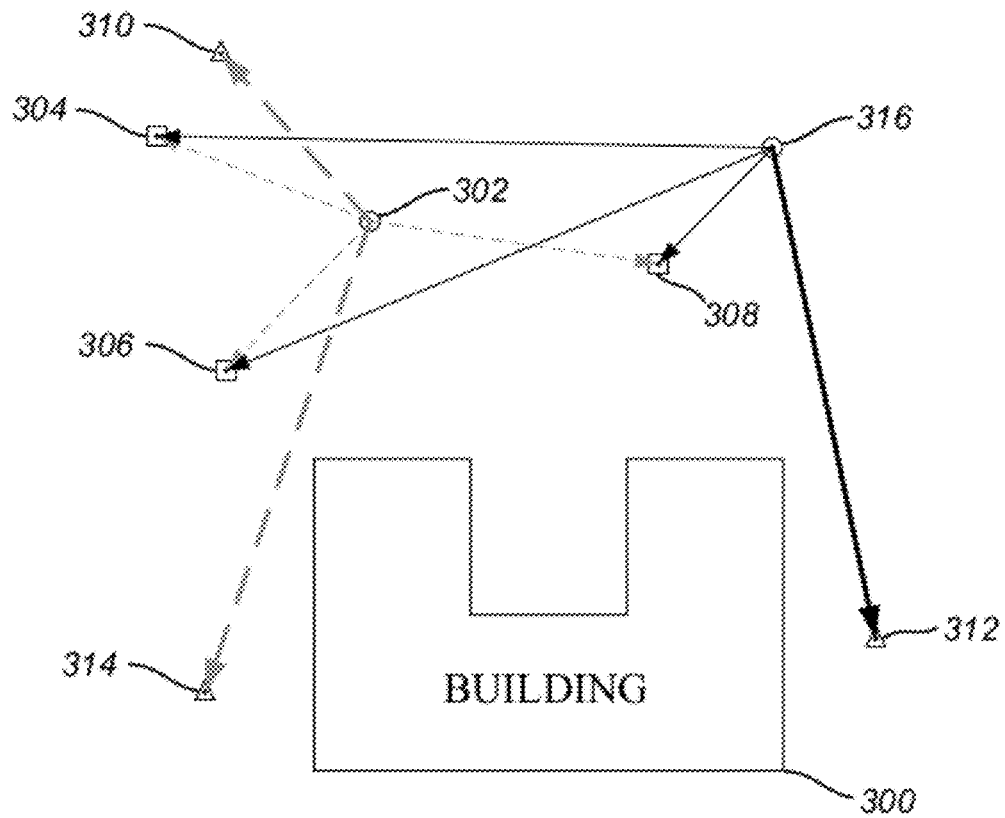
Figure 3C:
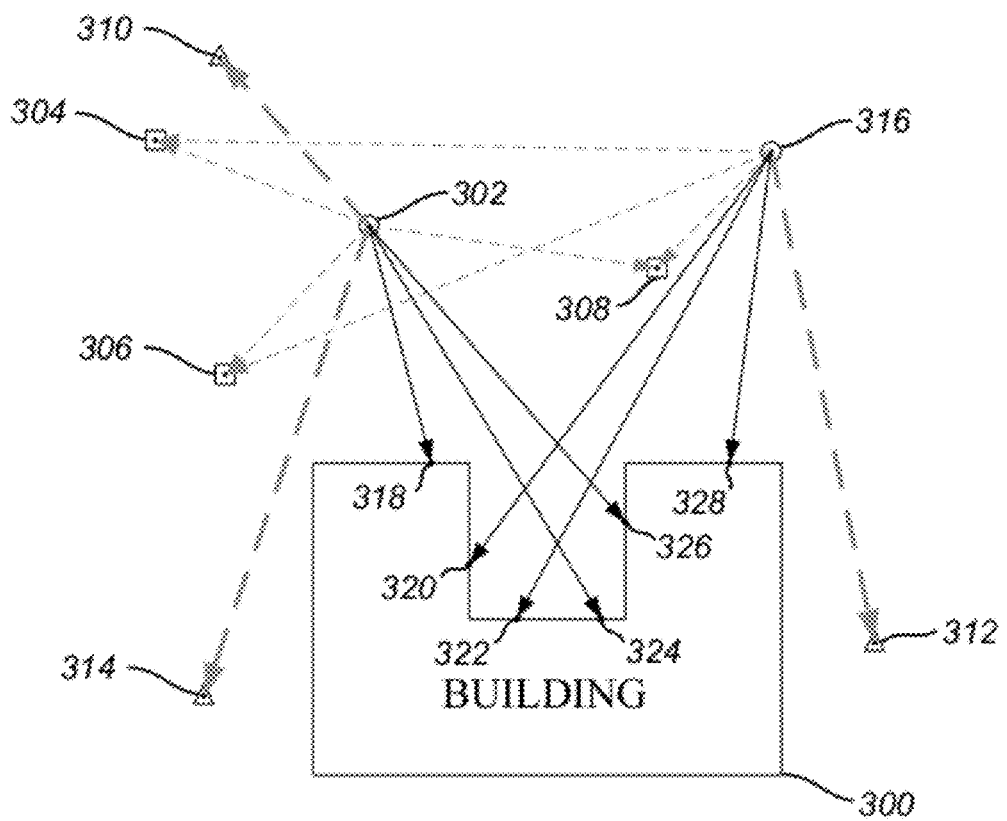

FIGS. 3A-3C are simplified plan views of a measurement site that illustrate an exemplary method of stationing an unleveled optical total station in accordance with another embodiment of the invention. The exemplary method illustrated in FIGS. 3A-3C involves determining positions of target points and control points at more than one station. Specifically, positions of three non-collinear target points are determined at first and second measurement stations, and positions of different control points are determined each measurement station. A target point may be a reference point at an unknown position in the local coordinate system, and a control point may be a reference point at a known position in the local coordinate system. Thus, in the exemplary method illustrated in FIGS. 3A-3C, the positions of three non-collinear target points are determined in first and second instrument coordinate systems allowing a first transformation to be determined between the first and second coordinate systems. This allows the positions of the control points to be determined in the first (or second) instrument coordinate system, and a second transformation to be determined between the first (or second) instrument coordinate system and the local coordinate system. Using the first and second transformations, positions of additional points that are measured using the unleveled optical total station at the first and/or second measurement stations can be determined in the local coordinate system.

FIG. 3A shows a plan view of a building 300, a first measurement station 302, target points 304, 306, 308, and control points 310, 312, 314. Merely for ease of explanation, first measurement station 302 is represented by a circle, target points 304, 306, 308 are represented by squares, and control points 310, 312, 314 are represented by triangles.

Without determining a position of first measurement station 302 in the local coordinate system, positions of target points 304, 306, 308 and positions of control points 310, 314 may be determined in a first instrument coordinate system (e.g., a coordinate frame associated with first measurement station 302) using the unleveled optical total station. This is illustrated in FIG. 3A by lines extending from first measurement station 302 to target point 304, 306, 308 and to control points 310, 314.

FIG. 3B shows a second measurement station 316. The unleveled optical total station may be moved from first measurement station 302 to second measurement station 316 or different unleveled optical total stations may be used at the different measurement stations. Without determining a position of second measurement station 316 in the local coordinate system, the positions of target points 304, 306, 308 and a position of control point 312 may be determined in a second instrument coordinate system (e.g., a coordinate frame associated with second measurement station 316) using the unleveled optical total station. This is illustrated in FIG. 3B by lines extending from second measurement station 316 to target points 304, 306, 308 and to control point 312.

Using the positions of target points 304, 306, 308 in the first instrument coordinate system and the positions of target points 304, 306, 308 in the second instrument coordinate system, a first transformation between the first instrument coordinate system and the second instrument coordinate system can be determined in accordance with known techniques. Using the first transformation, positions of control points 310, 312, 314 can be determined in either the first or second instrument coordinate system. For example, a position of control point 312 in the first instrument coordinate system can be determined, or positions of control points 310, 314 in the second instrument coordinate system can be determined.

Using the positions of control points 310, 312, 314 in the first (or second) instrument coordinate system and the known positions of control points 310, 312, 314 in the local coordinate system, a second transformation between the first (or second) instrument coordinate system and the local coordinate system can be determined in accordance with known techniques.

Using the first and second transformations, positions of additional points that are measured using the unleveled optical total station at first measurement station 302 and/or second measurement station 316 can be determined in the local coordinate system. This is illustrated in FIG. 3C, where additional points 318, 324, 326 are measured from first measurement station 302, and additional points 320, 322, 328 are measured from second measurement station 316. Using the first and second transformations, the positions of additional points 318, 320, 322, 324, 326, 328 in the local coordinate system can be determined in accordance with known techniques.

As explained above, an origin of an instrument coordinate system and/or a position of an antenna phase center of a position measurement device may be used to replace one or more of the control points 310, 312, 314 in determining the second transformation. Alternatively, the origin of the instrument coordinate system and/or the position of the antenna phase center may be used as additional control points to improve accuracy of the second transformation. In one embodiment, for example, an origin of the first instrument coordinate system may be used as a control point by positioning a center of rotation of the unleveled optical total station at a known height above a survey monument or other selected point having known coordinates in the local coordinate system. In another embodiment, for example, a position of an antenna phase center at second measurement station 316 may used as a control point by determining the position (e.g., latitude, longitude, and elevation) of the antenna phase center in the local coordinate system. One of ordinary skill in the art would recognize many variations, modifications, and alternative methods in accordance with these embodiments.

FIGS. 4A-4D are simplified plan views of a measurement site that illustrate an exemplary method of stationing an unleveled optical total station in accordance with another embodiment of the invention. The exemplary method illustrated in FIGS. 4A-4D extends the example illustrated in FIGS. 3A-3C to include a third measurement station and additional target points. Specifically, positions of at least three non-collinear target points are determined at first, second, and third measurement stations, where at least three of the non-collinear target points measured at each measurement station are the same target points as those measured at one of the other measurement stations. Further, a position of a different control point is measured at each of the measurement stations such that positions of three non-collinear control points are determined. Thus, in the exemplary method illustrated in FIGS. 4A-4D, the positions of at least three non-collinear target points are determined in first, second, and third instrument coordinate systems allowing transformations to be determined between each of the instrument coordinate systems. This allows the positions of the control points to be determined in any of the instrument coordinate systems, and allows a transformation to be determined between any one of the instrument coordinate systems and the local coordinate system. Using the transformations, positions of additional points that are measured using the unleveled optical total station at the first, second, and/or third measurement stations can be determined in the local coordinate system.

Figure 4A:
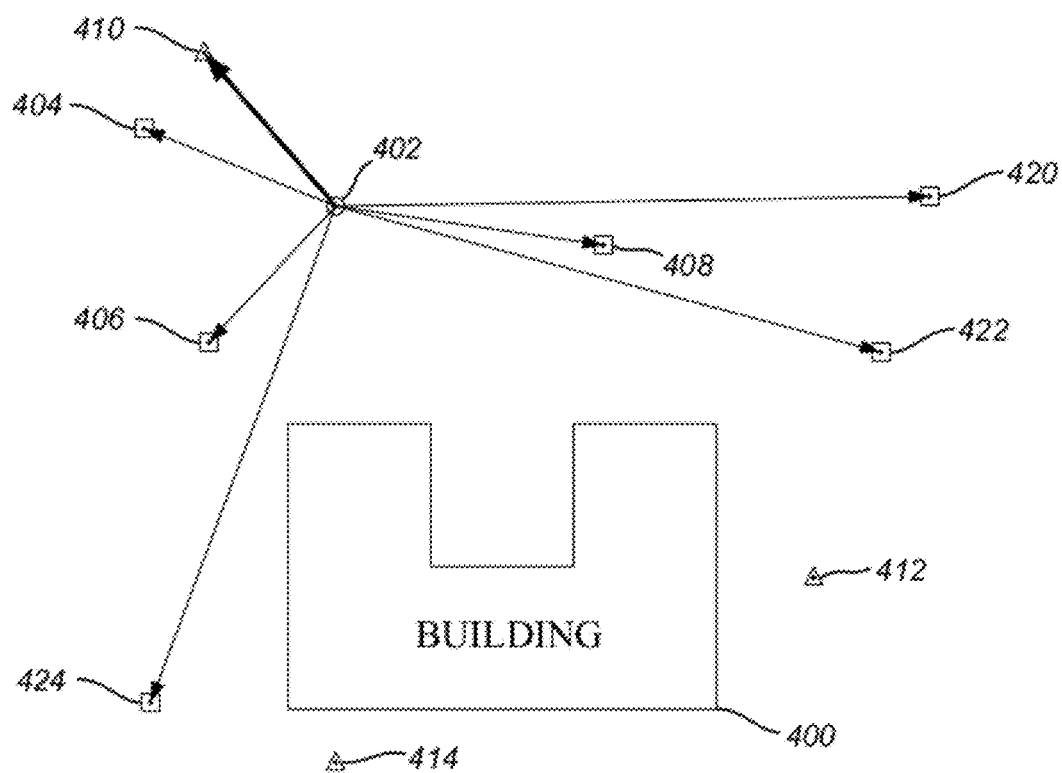
FIGS. 4A-4D are simplified plan views of a measurement site that illustrate an exemplary method of stationing an unleveled optical total station in accordance with another embodiment of the invention.

FIG. 4A shows a plan view of a building 400, a first measurement station 402, target points 404, 406, 408, 420, 422, 424 and control points 410, 412, 414. Merely for ease of explanation, first measurement station 402 is represented by a circle, target points 404, 406, 408, 420, 422, 424 are represented by squares, and control points 410, 412, 414 are represented by triangles.

Without determining a position of first measurement station 402 in the local coordinate system, positions of target points 404, 406, 408, 420, 422, 424 and a position of control point 410 may be determined in a first instrument coordinate system (e.g., a coordinate frame associated with first measurement station 402) using the unleveled optical total station. This is illustrated in FIG. 4A by lines extending from first measurement station 402 to target points 404, 406, 408, 420, 422, 424 and to control point 410.

Figure 4B:
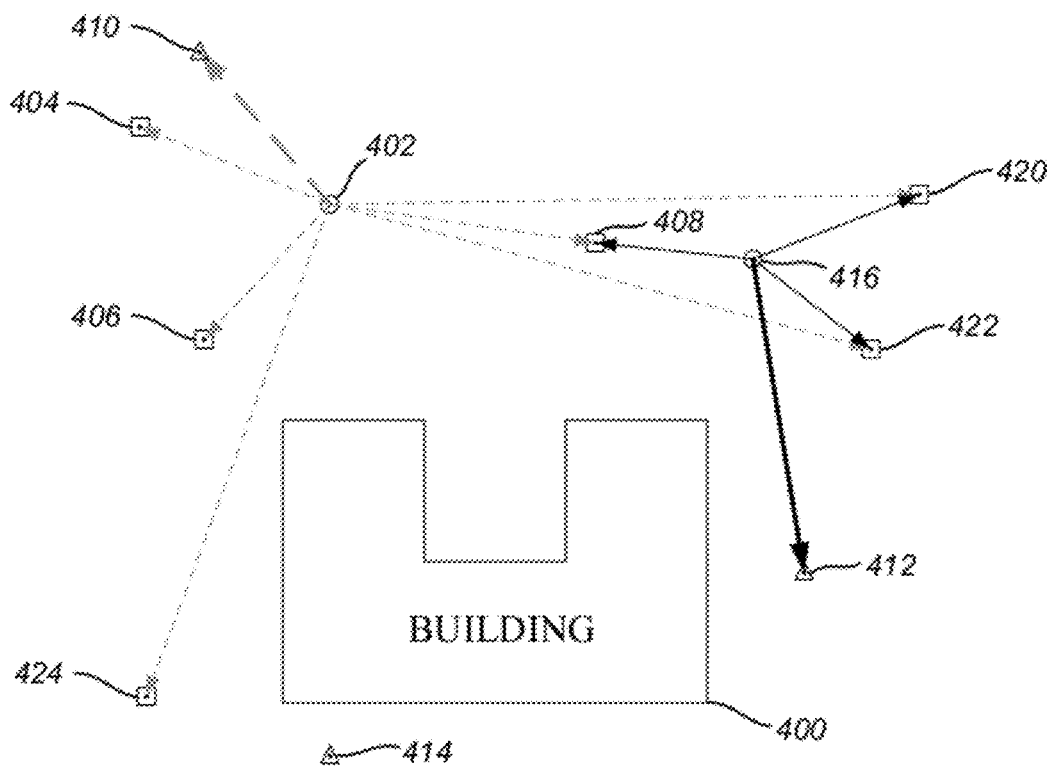

FIG. 4B shows a second measurement station 416. Without determining a position of second measurement station 416 in the local coordinate system, positions of target points 408, 420, 422 and a position of control point 412 may be determined in a second instrument coordinate system (e.g., a coordinate frame associated with second measurement station 416) using the unleveled optical total station. This is illustrated in FIG. 4B by lines extending from second measurement station 416 to target points 408, 420, 422 and to control point 412.

Figure 4C:
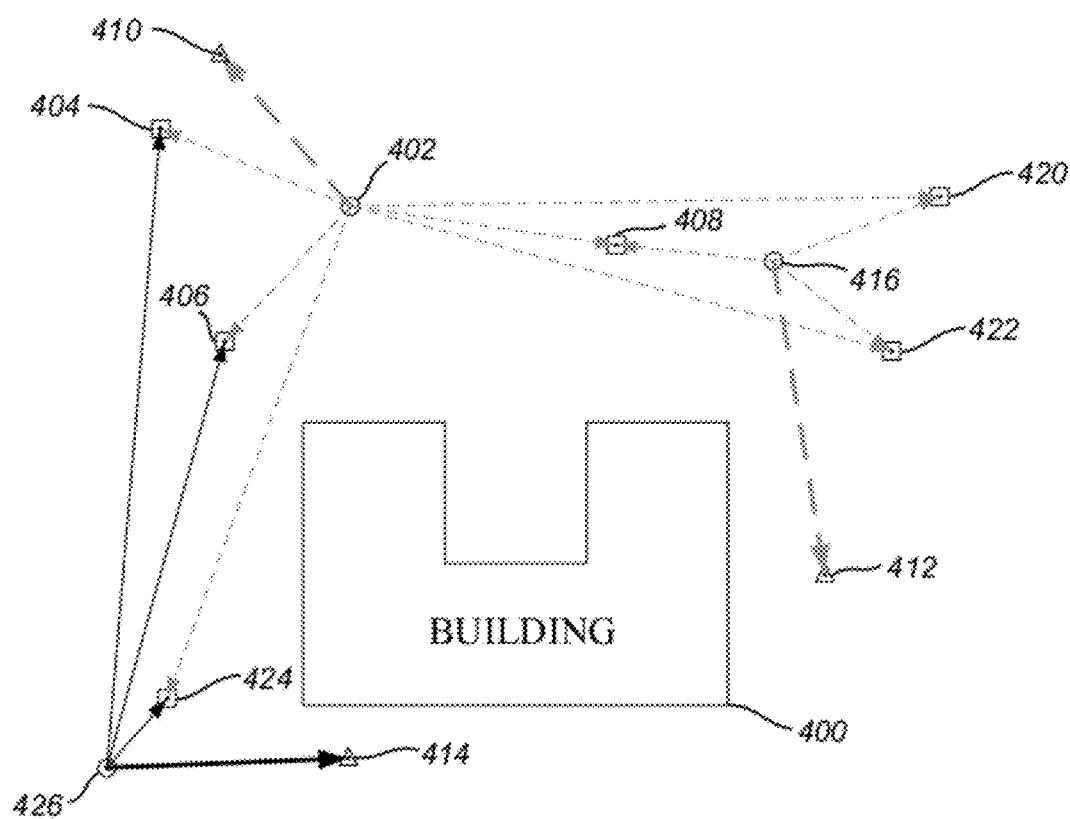

FIG. 4C shows a third measurement station 426. The unleveled optical total station may be moved from first measurement station 402 or second measurement station 416 or different unleveled optical total stations may be used at one or more of the different measurement stations. Without determining a position of third measurement station 426 in the local coordinate system, positions of target points 404, 406, 424 and a position of control point 414 may be determined in a third instrument coordinate system (e.g., a coordinate frame associated with third measurement station 426) using the unleveled optical total station. This is illustrated in FIG. 4C by lines extending from third measurement station 426 to target points 404, 406, 424 and to control point 414.

Using the positions of target points 404, 406, 408, 420, 422, 424 in the first instrument coordinate system, positions of target points 408, 420, 422 in the second instrument coordinate system, and positions of target points 404, 406, 424 in the third instrument coordinate system, transformations can be determined such the positions of the target points in each of the instrument coordinate systems can be determined in the first coordinate system. Using the transformations, positions of control points 410, 412, 414 can be determined in the first coordinate system as well.

Using the positions of control points 410, 412, 414 in the first instrument coordinate system and the known positions of control points 410, 412, 414 in the local coordinate system, a second transformation between the first instrument coordinate system and the local coordinate system can be determined in accordance with known techniques. The transformations allow the positions of the target points and control points to be determined in the second or third instrument coordinate system as well, and the second transformation could be determined between the second or third instrument coordinate system and the local coordinate system.

Figure 4D:
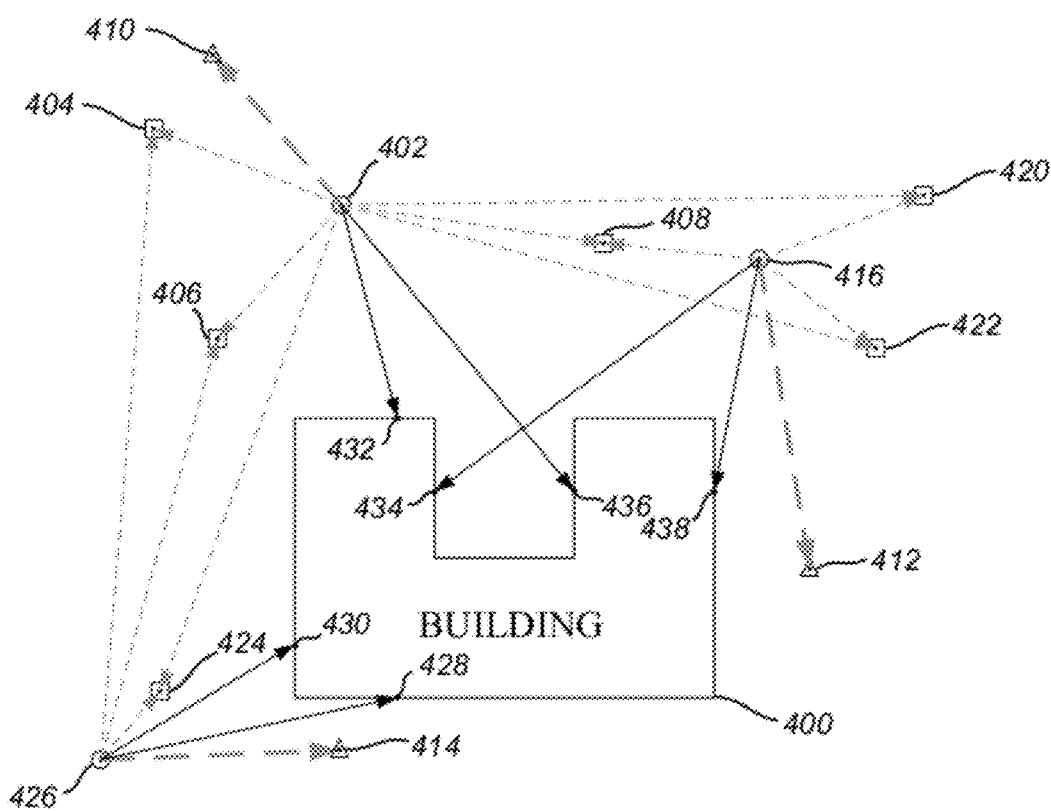

Using the transformations, positions of additional points that are measured using the unleveled optical total station at first measurement station 302, second measurement station 316, and/or third measurement station 426 can be determined in the local coordinate system. This is illustrated in FIG. 4D, where additional points 432, 436 are measured from first measurement station 402, additional points 434, 438 are measured from second measurement station 416, and additional points 428, 430 are measured from third measurement station 426. Using the transformations, the positions of additional points 428, 430, 432, 434, 436, 438 in the local coordinate system can be determined in accordance with known techniques.

As explained above, an origin of an instrument coordinate system and/or a position of an antenna phase center of a position measurement device may also be used in determining the second transformation.

It should be appreciated that the examples illustrated in FIGS. 2A-2B, 3A-3C, and 4A-4D are provided merely as examples of particular methods of stationing an unleveled optical total station in accordance with embodiments of the invention. The concepts illustrated by these examples could be applied to any number of measurement stations and measurements of any number of control points at each station in accordance with embodiments of the present invention.

Figure 5:
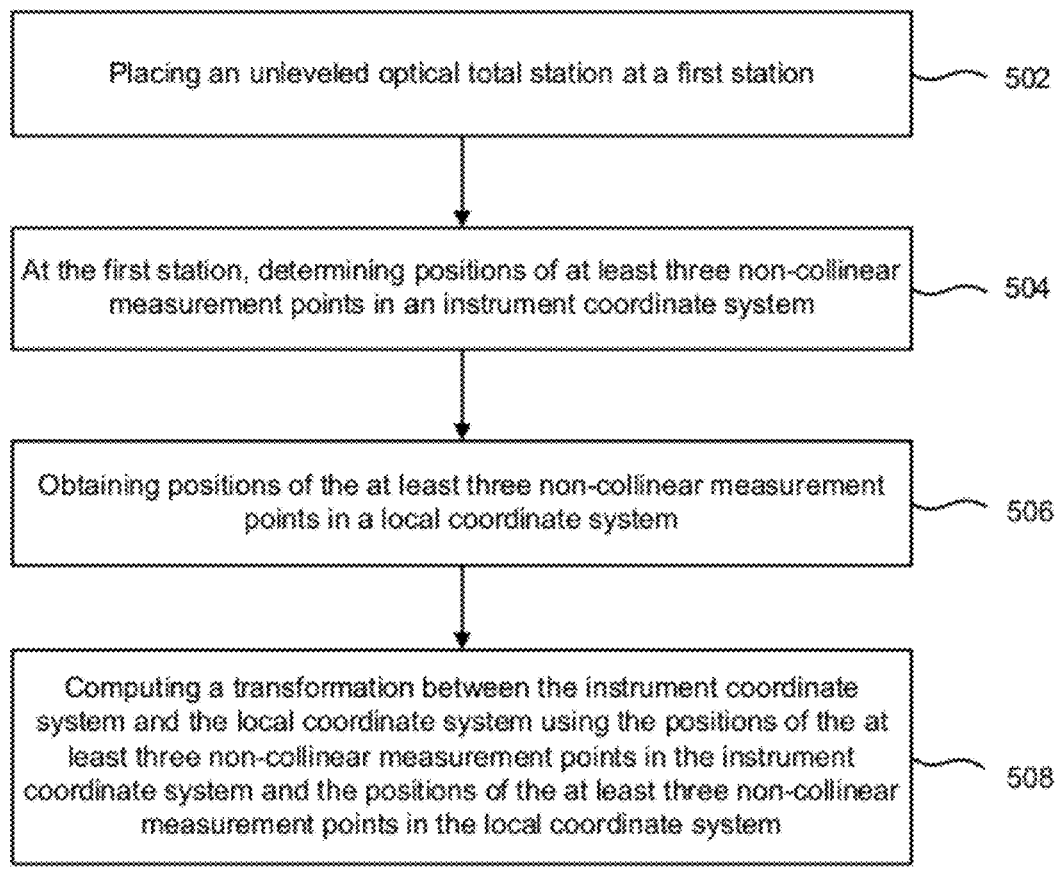
FIG. 5 is a simplified flowchart illustrating an exemplary method of stationing an unleveled optical total station in accordance with an embodiment of the invention.

In light of the above examples, one of ordinary skill in the art would recognize many variations, modifications, and alternative methods. As an example, FIG. 5 is a simplified flowchart illustrating a method of stationing an unleveled optical total station in accordance with an embodiment of the invention. The method includes placing the unleveled optical total station at a first station (502). In an embodiment, the unleveled optical total station is placed at a station without determining a position of the first station in the local coordinate system. The method also includes, at the first station, determining positions of at least three non-collinear measurement points in an instrument coordinate system (504). The positions of the at least three non-collinear measurement points are determined using the unleveled optical total station. The method also includes obtaining positions of the at least three non-collinear measurement points in a local coordinate system (506). In an embodiment, the at least three non-collinear points are at known locations in the local coordinate system. The positions may be obtained, for example, from previous measurements stored in memory of the unleveled optical total station. The method also includes computing a transformation between the instrument coordinate system and the local coordinate system using the positions of the at least three non-collinear measurement points in the instrument coordinate system and the positions of the at least three non-collinear measurement points in the local coordinate system (508). In an embodiment, the transformation may be used to determine coordinates of additional measurement points in the local coordinate system.

Figure 6:
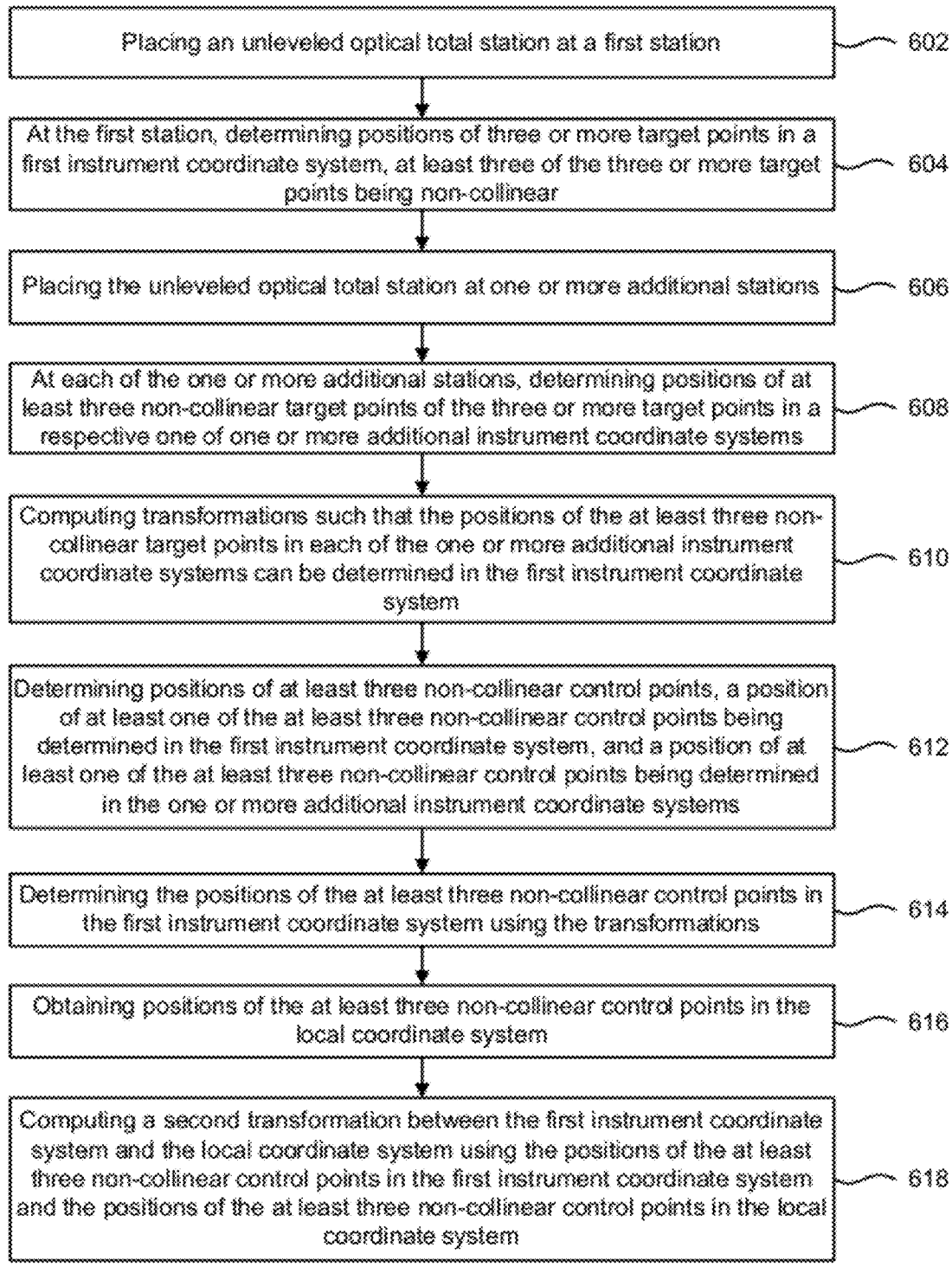
FIG. 6 is a simplified flowchart illustrating an exemplary method of stationing an unleveled optical total station in accordance with another embodiment of the invention.

FIG. 6 is a simplified flowchart illustrating an exemplary method of stationing an unleveled optical total station in accordance with another embodiment of the invention. The method includes placing the unleveled optical total station at a first station (602). The method also includes, at the first station, determining positions of three or more target points in a first instrument coordinate system, where at least three of the three or more target points are non-collinear (604). The positions of the three or more target points are determined using the unleveled optical total station. The method also includes placing the unleveled optical total station at one or more additional stations (606). In an embodiment, the one or more additional stations are each physically different locations from the first station. The unleveled optical total station may be moved between each of the different locations, or different unleveled optical total stations may be used at each station. The method also includes, at each of the one or more additional stations, determining positions of at least three non-collinear target points of the three or more target points in a respective one of one or more additional instrument coordinate systems (608). The positions of the at least three non-collinear target points are determined using the unleveled optical total station. The method also includes computing transformations such that the positions of the at least three non-collinear target points in each of the one or more additional instrument coordinate systems can be determined in the first instrument coordinate system (610).

The method also includes determining positions of at least three non-collinear control points (612). A position of at least one of the at least three non-collinear control points is determined in the first instrument coordinate system, and a position of at least one of the at least three non-collinear control points is determined in the one or more additional instrument coordinate systems. The positions of the at least three non-collinear control points are determined using the unleveled optical total station. The method also includes determining the positions of the at least three non-collinear control points in the first instrument coordinate system using the transformations (614). The method also includes obtaining positions of the at least three non-collinear control points in the local coordinate system (616). The method also includes computing a second transformation between the first instrument coordinate system and the local coordinate system using the positions of the at least three non-collinear control points in the first instrument coordinate system and the positions of the at least three non-collinear control points in the local coordinate system (618).

Figure 7:
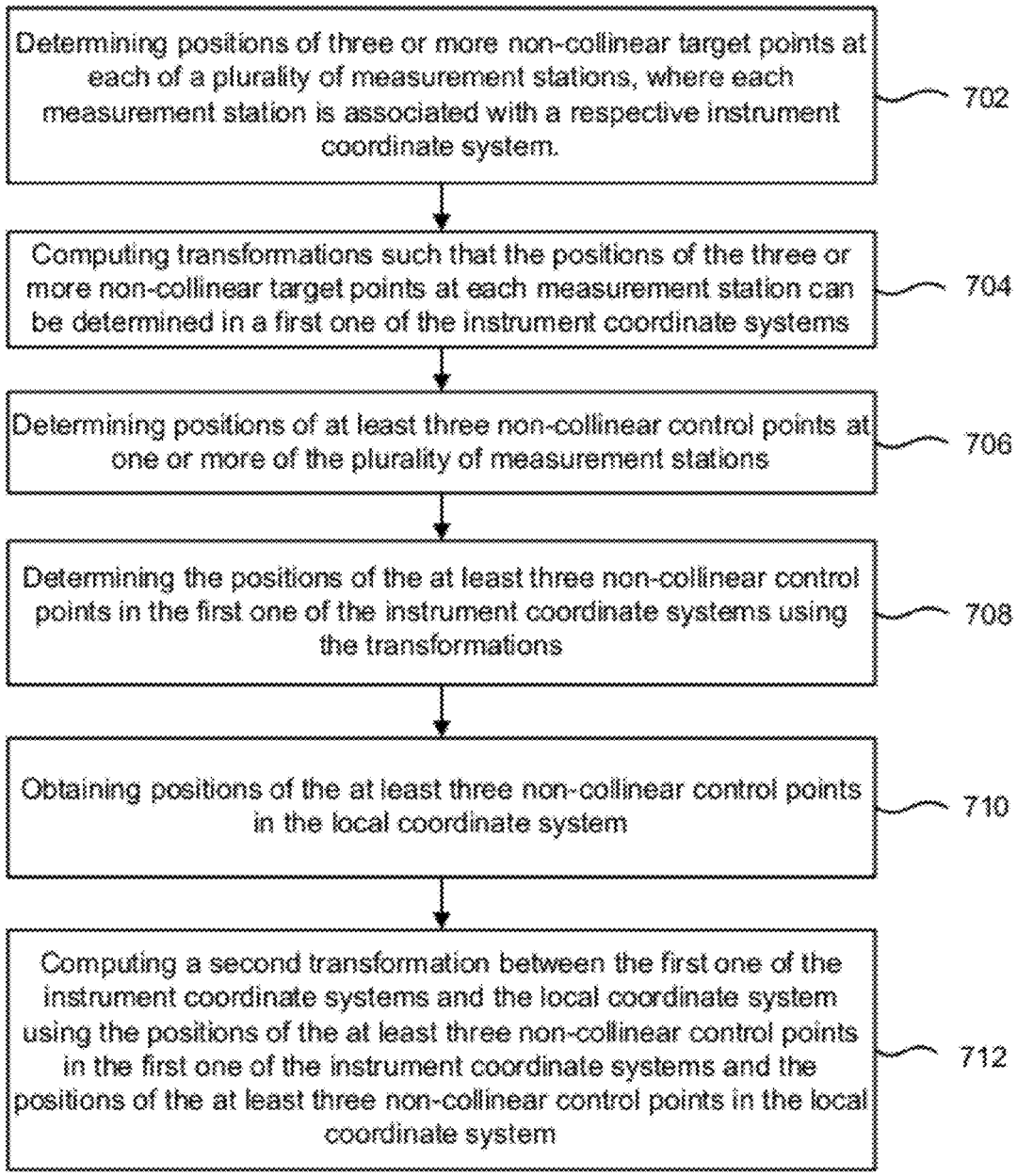
FIG. 7 is a simplified flowchart illustrating an exemplary method of stationing an unleveled optical total station in accordance with another embodiment of the invention.

FIG. 7 is a simplified flowchart illustrating an exemplary method of stationing an unleveled optical total station in accordance with another embodiment of the invention. The method includes determining positions of three or more non-collinear target points at each of a plurality of measurement stations, where each measurement station is associated with a respective instrument coordinate system (702). The three or more non-collinear target points at each measurement station are common with three or more non-collinear target points at another one of the plurality of measurement stations. The positions of the three or more non-collinear target points may be determined using the unleveled optical total station. The method also includes computing transformations such that the positions of the three or more non-collinear target points at each measurement station can be determined in a first one of the instrument coordinate systems (704). The method also includes determining positions of at least three non-collinear control points at one or more of the plurality of measurement stations (706). The positions of the at least three non-collinear control points may be determined using the unleveled optical total station. The method also includes determining the positions of the at least three non-collinear control points in the first one of the instrument coordinate systems using the transformations (708). The method also includes obtaining positions of the at least three non-collinear control points in the local coordinate system (710). The method also includes computing a second transformation between the first one of the instrument coordinate systems and the local coordinate system using the positions of the at least three non-collinear control points in the first one of the instrument coordinate systems and the positions of the at least three non-collinear control points in the local coordinate system (712).

It should be appreciated that the specific steps illustrated in FIGS. 5-7 provide particular methods of stationing an unleveled optical total station in accordance with embodiments of the present invention. The steps outlined above may be continuously repeated by system software. Other sequences of steps may also be performed according to alternative embodiments. For example, alternative embodiments of the present invention may perform the steps outlined above in a different order. Moreover, the individual steps illustrated in FIGS. 5-7 may include multiple sub-steps that may be performed in various sequences as appropriate to the individual step. Furthermore, additional steps may be added or removed depending on the particular application. One of ordinary skill in the art would recognize many variations, modifications, and alternatives.

The target points used, for example, in the methods illustrated in FIGS. 6-7 may be arbitrarily chosen points and/or they may be associated with physical objects or targets. When physical targets are used, they may be placed in positions where they are visible and/or easily located from one or more measurement stations. In some environments, such as construction sites or factories, targets may be installed as infrastructure at known or unknown positions in the local coordinate system. When placed at known positions, the targets may serve as control points as described previously.

In an embodiment of the present invention, the methods illustrated in FIGS. 2A-2B, 3A-3C, 4A-4D and the methods described in FIGS. 5-7 may be embodied in software and configured such that the steps can be carried out by an optical total station in an automated or semi-automated manner. As an example, instructions may be included such that the optical total station is configured to automatically locate one or more targets at each station and determine positions of the targets in an instrument coordinate system. Instructions may also be included such that the optical total station is configured to locate and determine positions of control points in the instrument coordinate system. Further, instructions may be provided such that the optical total station is configured to automatically compute transformations and determine positions of additional points in the local coordinate system. Each of these functions may be performed in accordance with known techniques.

It should be appreciated that transformations between coordinate systems can be determined using known algorithms. As an example, a Procrustes algorithm may be used as follows. $p(i,s)$ will be used to denote the 3D Cartesian coordinates of point i in an instrument coordinate system at measurement station s. For convenience, a first measurement station will be denoted as s=1 and the local coordinate system will be denoted as s=0. Each target point, control point, GNSS measurement, and additional point (i.e., additional point as illustrated in FIG. 4D) will have an associated point index i. The process of associating a point with its index i is that of identifying it using either an automatic or a manual process.

Since each point $p(i,s)$ may be at a known or unknown position in the local coordinate system, the function $K(s)$ can provide a set of point indices for which $p(i,s)$ is known. If $N(S)$ is the number of elements in set S, then $N(K(s))$ is the number of points at measurement station s that are at known positions in the local coordinate system.

If a control point i has known coordinates in the local coordinate system c, then $p(i,0)=c$. If m is a measured position of the control point in an instrument coordinate system at measurement station s, then $p(i,s)=m$.

If m is a measured position of a target point i in an instrument coordinate system at station s, then $p(i,s)=m$.

If m is a position in the local coordinate system that is determined using a GNSS measurement i at measurement station s, then $p(i,0)=m$ and $p(i,s)=g$, where g is the position of the GNSS antenna phase centre in the instrument coordinate system.

If m is a measured position of an additional point i in an instrument coordinate system at measurement station s, then $p(i,s)=m$.

Assuming that all p(i,s) are initially unknown, at the first station s:
  positions of target points in the instrument coordinate system can be determined using the unlevelled optical total station;
  positions of control points in the local coordinate system are known;
  positions of control points in the instrument coordinate system can be determined using the unlevelled optical total station;
  positions of GNNS measurements in the local coordinate system are known; and
  positions of additional points in the instrument coordinate system can be determined using the unlevelled optical total station.

If $N(K(0) \cap K(1)) \geq 3$, then coordinate transform $X_{1 \to L}$ from the instrument coordinate system at measurement station 1 to the local coordinate system can be determined using equations 1.1-1.4 below.

Each point p(i,1) having known coordinates in the local coordinate system can be assigned as $p(i,0)=X_{1 \to L} \cdot p(i,1)$.

At measurement station s where $s \neq 1$:
  positions of target points in the instrument coordinate system can be determined using the unlevelled optical total station;
  positions of control points in the local coordinate system are known;
  positions of control points in the instrument coordinate system can be determined using the unlevelled optical total station;
  positions of GNNS measurements in the local coordinate system are known; and
  positions of additional points in the instrument coordinate system can be determined using the unlevelled optical total station.

If $N(K(s-1) \cap K(s)) \geq 3$, then the coordinate transform $X_{(s-1) \to s}$ from the instrument coordinate system at measurement station s−1 to measurement station s can also be determined using equations 1.1-1.4 below.

Each point p(i,s−1) having known coordinates in the local coordinate system can be assigned as $p(i,s)=X_{(s-1) \to s} \cdot p(i,s-1)$.

If $N(K(0) \cap K(s)) \geq 3$, then the coordinate transform $X_{s \to L}$ from the instrument coordinate system at measurement station s to the local coordinate system can be determined using equations 1.1-1.4 below.

Measurements can be made at subsequent stations using the unleveled optical total station until (a) positions of all additional points in an instrument coordinate system have been determined (i.e., measured), and (b) positions of all additional points in the local coordinate system have been determined.

Transformations between coordinate systems can be determined using known and measured positions of points in each coordinate system. The transforms can be three-dimensional Euclidean transforms. That is to say, they may consist of a rotation and a translation in three-dimensional Cartesian space.

Given n corresponding points $pA_1 \ldots pA_n$ and $pB_1 \ldots pB_n$, the method can be applied by computing the transform using non-homogenous coordinates (e.g., of the form $[x, y, z]^T$), but computing the transform to be applied to homogeneous coordinates (e.g., of the form $[x, y, z, 1]^T$). The transform may be a four by four homogeneous transform $X_{A \to B}$ such that $pB_i = X_{A \to B} \cdot pA_i$.

A mean may be subtracted from each set of points so that they are 'zero meaned' as follows:

$$\overline{pA} = \frac{\sum_{i=1}^{n} pA_i}{n}, \quad pA_i' = pA_i - \overline{pA} \qquad (1.1)$$

$$\overline{pB} = \frac{\sum_{i=1}^{n} pB_i}{n}, \quad pB_i' = pB_i - \overline{pB}$$

The transform from A' to B' can be determined by singular value decomposition using the equation:

$$USV^T = svd\left(\sum_{i=1}^{n} pA_i' \cdot pB_i'^T\right) \qquad (1.2)$$

Where $V^T U^T$ may be an orthogonal transform from $pA_i'$ to $pB_i'$. Checking its determinant to ensure that it is a rotation matrix:

$$\text{if } |V^T U^T| = 1 \qquad (1.3)$$

$$\text{then } R_{A' \to B'} = V^T U^T$$

$$\text{else } R_{A' \to B'} = V^T \begin{bmatrix} 1 & 0 & 0 \\ 0 & 1 & 0 \\ 0 & 0 & -1 \end{bmatrix} U^T$$

The transformation $X_{A \to B}$ may be calculated by compounding the sub-transforms:

$$X_{A \to B} = \begin{bmatrix} 0 & 0 & 0 & \\ 0 & 0 & 0 & \overline{pB} \\ 0 & 0 & 0 & \\ 0 & 0 & 0 & 1 \end{bmatrix} \begin{bmatrix} & & & 0 \\ & R_{A' \to B'} & & 0 \\ & & & 0 \\ 0 & 0 & 0 & 1 \end{bmatrix} \begin{bmatrix} 0 & 0 & 0 & \\ 0 & 0 & 0 & -\overline{pA} \\ 0 & 0 & 0 & \\ 0 & 0 & 0 & 1 \end{bmatrix} \qquad (1.4)$$

Figure 8A:
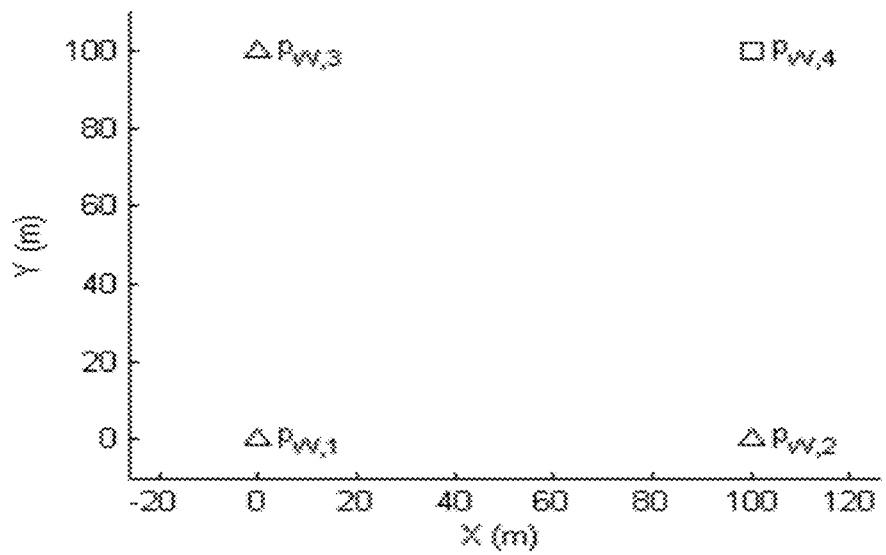
FIG. 8A is a simplified plan view of points in a local coordinate system.

The following example is provided to illustrate a method of stationing an unleveled optical total station in accordance with an embodiment of the invention. TABLE 1 lists positions of points $p_{W,1}$, $p_{W,2}$, $p_{W,3}$, and $p_{W,4}$ in the local coordinate system (i.e., world coordinate system). The positions of these points in the local coordinate system are also illustrated in FIG. 8A.

TABLE 1

|  | Easting(X) | Northing(Y) | Elevation(Z) |
| --- | --- | --- | --- |
| $p_{W,1}$ | 0.000 | 0.000 | 3.000 |
| $p_{W,2}$ | 100.000 | 0.000 | 11.000 |
| $p_{W,3}$ | 0.000 | 100.000 | 7.000 |
| $p_{W,4}$ | 100.000 | 100.000 | 5.000 |

Figure 8B:
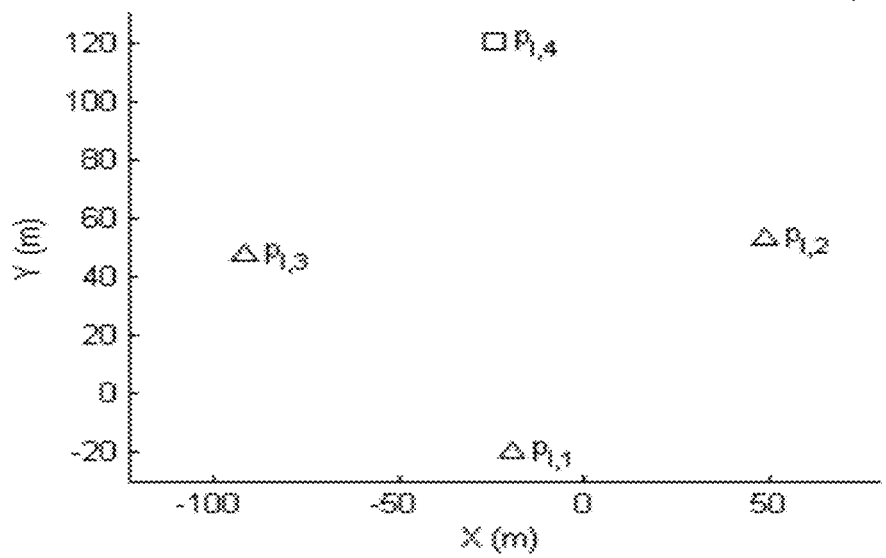
FIG. 8B is a simplified plan view of the same points in an instrument coordinate system in accordance with an embodiment of the invention.

TABLE 2 lists positions of the same points $p_{W,1}$, $p_{W,2}$, $p_{W,3}$, and $p_{W,4}$ in an instrument coordinate system as measured using an unleveled optical total station. The positions of these points in the instrument coordinate system are also illustrated in FIG. 8B.

TABLE 2

|        | X       | Y       | Z      |
|--------|---------|---------|--------|
| $p_{I,1}$ | −19.739 | −20.156 | −2.016 |
| $p_{I,2}$ | 48.899  | 52.773  | 3.835  |
| $p_{I,3}$ | −92.247 | 47.408  | 11.899 |
| $p_{I,4}$ | −24.481 | 120.858 | 7.801  |

A transformation between the local coordinate system and the instrument coordinate system is determined below using the positions of the points $p_{W,1}$, $p_{W,2}$, and $p_{W,3}$ in each coordinate system. For illustrative purposes, the transformation is then used to determine the position of point $p_{W,4}$ in the local coordinate system.

Using the Procrustes algorithm described above, a mean of the first three points in the local coordinate system is $\overline{p_{W,1\ldots3}} = [33.333\ 33.333\ 7.000]$ and a mean of the first three points in the instrument coordinate system is $\overline{p_{I,1\ldots3}} = [-21.029\ 26.675\ 4.573]^T$. Subtracting the mean from the initial coordinates provides:

$$p_{I',1} = [1.290\ -46.831\ -6.588]^T$$

$$p_{I',2} = [69.928\ 26.098\ -0.738]^T$$

$$p_{I',3} = [-71.218\ 20.733\ 7.326]^T$$

$$p_{W',1} = [-33.333\ -33.333\ -4.000]^T$$

$$p_{W',2} = [66.667\ -33.333\ 4.000]^T$$

$$p_{W',3} = [-33.333\ 66.667\ 0.000]^T$$

Using these values in equation (1.2) above provides:

$$\sum_{i=1}^{n} pI'_i \cdot pW'^T_i = p_{I',1} \cdot p^T_{W',1} + p_{I',2} \cdot p^T_{W',2} + p_{I',3} \cdot p^T_{W',3} = \begin{bmatrix} 6992.8 & -7121.8 & 274.552 \\ 2609.8 & 2073.3 & 391.716 \\ -73.767 & 732.633 & 23.404 \end{bmatrix}$$

$$USV^T = svd\left(\sum_{i=1}^{n} pI'_i \cdot pW'^T_i\right) = svd\left(\begin{bmatrix} 6992.8 & -7121.8 & 274.552 \\ 2609.8 & 2073.3 & 291.716 \\ -73.767 & 732.633 & 23.404 \end{bmatrix}\right)$$

$$U = \begin{bmatrix} -0.9976 & 0.0309 & 0.0617 \\ -0.0391 & -0.9897 & -0.1374 \\ 0.0568 & -0.1395 & 0.9886 \end{bmatrix}$$

$$S = \begin{bmatrix} 10008.03 & 0 & 0 \\ 0 & 3357.3 & 0 \\ 0 & 0 & 0 \end{bmatrix}$$

$$V^T = \begin{bmatrix} -0.707673321221947 & -0.702032238634019 & -0.0796819072889596 \\ 0.705969776669217 & -0.70712047972203 & -0.0398409536444798 \\ -0.0283750746309871 & -0.0844473982796028 & 0.996023841111995 \end{bmatrix},$$

Using these values and equation (1.3) above provides:

$$|V^T U^T| = 1$$

$$\therefore R_{I' \to W'} =$$

$$V^T U^T = \begin{bmatrix} 0.679404149228922 & 0.73346151801027 & -0.0210760383700906 \\ -0.728569403615247 & 0.677727640083965 & 0.0993572844935989 \\ 0.871586262296979 & -0.0521483217782601 & 0.994828591471648 \end{bmatrix},$$

Using these values and equation (1.4) above provides:

$$X_{I \to W} = \begin{bmatrix} 0 & 0 & 0 & \\ 0 & 0 & 0 & \overline{p_{W,1\ldots3}} \\ 0 & 0 & 0 & \\ 0 & 0 & 0 & 1 \end{bmatrix} \begin{bmatrix} & & & 0 \\ & R_{I' \to W'} & & 0 \\ & & & 0 \\ 0 & 0 & 0 & 1 \end{bmatrix} \begin{bmatrix} 0 & 0 & 0 & \\ 0 & 0 & 0 & -\overline{p_{I,1\ldots3}} \\ 0 & 0 & 0 & \\ 0 & 0 & 0 & 1 \end{bmatrix}$$

$$= \begin{bmatrix} 0 & 0 & 0 & 33.333 \\ 0 & 0 & 0 & 33.333 \\ 0 & 0 & 0 & 7.000 \\ 0 & 0 & 0 & 1 \end{bmatrix} \begin{bmatrix} 0.679404 & 0.733461 & -0.021076 & 0 \\ -0.728569 & 0.677727 & 0.099357 & 0 \\ 0.087158 & -0.052148 & 0.994828 & 0 \\ 0 & 0 & 0 & 1 \end{bmatrix} \begin{bmatrix} 0 & 0 & 0 & 21.029 \\ 0 & 0 & 0 & -26.675 \\ 0 & 0 & 0 & -4.573 \\ 0 & 0 & 0 & 1 \end{bmatrix}$$

$$= \begin{bmatrix} 0.679404 & 0.733461 & -0.021076 & 28.151811 \\ -0.728569 & 0.677727 & 0.099357 & -0.520465 \\ 0.087158 & -0.052148 & 0.994828 & 53674895 \\ 0 & 0 & 0 & 1 \end{bmatrix}$$

Using the transformation, the position of point $p_{W,4}$ in the local coordinate system can be determined as follows:

$$p_{W,4} = X_{I \to W} \cdot p_{I,4}$$

$$= \begin{bmatrix} 0.679404 & 0.733461 & -0.021076 & 28.151811 \\ -0.728569 & 0.677727 & 0.099357 & -0.520465 \\ 0.087158 & -0.052148 & 0.994828 & 5.674895 \\ 0 & 0 & 0 & 1 \end{bmatrix} \begin{bmatrix} -24.481 \\ 120.858 \\ 7.801 \\ 1 \end{bmatrix}$$

$$= \begin{bmatrix} 100.000 \\ 100.000 \\ 4.999 \\ 1 \end{bmatrix}$$

which, allowing for the numerical accuracy of the calculation, is the same position for point $p_{W,4}$ as is listed in TABLE 1 above.

It should be noted that the methods and apparatuses discussed throughout the specification are provided merely as examples. Various embodiments may omit, substitute, or add various procedures or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

What is claimed is:

1. A method of stationing an unleveled optical total station, the method comprising:
    placing the unleveled optical total station at a first station;
    at the first station, determining positions of at least three non-collinear measurement points in an instrument coordinate system using the unleveled optical total station;
    obtaining positions of the at least three non-collinear measurement points in a local coordinate system; and
    computing a transformation between the instrument coordinate system and the local coordinate system using the positions of the at least three non-collinear measurement points in the instrument coordinate system and the positions of the at least three non-collinear measurement points in the local coordinate system.

2. The method of claim 1 wherein the unleveled optical total station is used to determine coordinates of additional measurement points in the local coordinate system, the method further comprising:
    determining positions of the additional measurement points in the instrument coordinate system using the unleveled optical total station; and
    determining the coordinates of the additional measurement points in the local coordinate system using the transformation.

3. The method of claim 1 wherein a position of one of the at least three non-collinear measurement points in the instrument coordinate system comprises a vertical angle, a horizontal angle, and a distance relative to the unleveled optical total station.

4. The method of claim 1 wherein a position of one of the at least three non-collinear measurement points in the instrument coordinate system is at an origin of the instrument coordinate system.

5. The method of claim 1 wherein a position of one of the at least three non-collinear measurement points in the instrument coordinate system is coincident with an antenna phase center of a global navigation satellite system.

6. The method of claim 1 wherein a position of one of the at least three non-collinear measurement points in the instrument coordinate system is obtained using a position measurement device.

7. The method of claim 1 wherein a position of one of the at least three non-collinear measurement points in the instrument coordinate system is obtained using a global navigation satellite system, and an antenna of the global navigation satellite system is rigidly fixed to a telescope of the unleveled optical total station such that a phase center of the antenna is at a known position in the instrument coordinate system.

8. The method of claim 1 wherein a position of one of the at least three non-collinear measurement points in the local coordinate system is obtained by positioning the unleveled optical total station over a point having known coordinates in the local coordinate system.

9. The method of claim 1 wherein placing the unleveled optical total station at the first station comprises positioning an origin of the instrument coordinate system at a known height above a point having known coordinates in the local coordinate system.

10. The method of claim 1 wherein an origin of the instrument coordinate system is a center of rotation of the unleveled optical total station.

11. The method of claim 1 wherein the unleveled optical total station is used to determine coordinates of additional points in the local coordinate system, the method further comprising:
    placing the unleveled optical total station at a second station different from the first station;
    at the second station, determining positions of the at least three non-collinear measurement points in a second instrument coordinate system using the unleveled optical total station;
    computing a second transformation between the second instrument coordinate system and the local coordinate system using the positions of the at least three non-collinear measurement points in the second instrument coordinate system and the positions of the at least three non-collinear measurement points in the local coordinate system;
    determining positions of the additional points in the second instrument coordinate system using the unleveled optical total station; and
    determining the coordinates of the additional points in the local coordinate system using the second transformation.

12. A method of stationing an unleveled optical total station, the method comprising:
    placing the unleveled optical total station at a first station;
    at the first station, determining positions of three or more target points in a first instrument coordinate system using the unleveled optical total station, at least three of the three or more target points being non-collinear;
    placing the unleveled optical total station at one or more additional stations;

at each of the one or more additional stations, determining positions of at least three non-collinear target points of the three or more target points in a respective one of one or more additional instrument coordinate systems using the unleveled optical total station;

computing transformations such that the positions of the at least three non-collinear target points in each of the one or more additional instrument coordinate systems can be determined in the first instrument coordinate system;

determining positions of at least three non-collinear control points, a position of at least one of the at least three non-collinear control points being determined in the first instrument coordinate system, and a position of at least one of the at least three non-collinear control points being determined in the one or more additional instrument coordinate systems;

determining the positions of the at least three non-collinear control points in the first instrument coordinate system using the transformations;

obtaining positions of the at least three non-collinear control points in the local coordinate system; and computing a second transformation between the first instrument coordinate system and the local coordinate system using the positions of the at least three non-collinear control points in the first instrument coordinate system and the positions of the at least three non-collinear control points in the local coordinate system.

13. The method of claim 12 wherein a position of one of the at least three non-collinear control points in the first instrument coordinate system comprises a vertical angle, a horizontal angle, and a distance relative to the unleveled optical total station at the first station.

14. The method of claim 12 wherein a position of one of the at least three non-collinear control points in the first instrument coordinate system is at an origin of the first instrument coordinate system.

15. The method of claim 12 wherein a position of one of the at least three non-collinear control points in the first instrument coordinate system is coincident with an antenna phase center of a global navigation satellite system.

16. The method of claim 12 wherein a position of one of the at least three non-collinear control points in the local coordinate system is obtained using a position measurement device.

17. The method of claim 12 wherein a position of one of the at least three non-collinear control points in the first instrument coordinate system is obtained using a global navigation satellite system, and an antenna of the global navigation satellite system is rigidly fixed to a telescope of the unleveled optical total station such that a phase center of the antenna is at a known position in the first instrument coordinate system.

18. The method of claim 12 wherein a position of one of the at least three non-collinear control points in the local coordinate system is obtained by positioning the unleveled optical total station over a point having known coordinates in the local coordinate system.

19. The method of claim 12 wherein placing the unleveled optical total station at the first station comprises positioning an origin of the instrument coordinate system at a known height above a point having known coordinates in the local coordinate system.

20. The method of claim 12 wherein the unleveled optical total station is used to determine coordinates of additional points in the local coordinate system, the method further comprising:

determining positions of a first portion of the additional points in the first instrument coordinate system using the unleveled optical total station;

determining positions of a second portion of the additional points in the one or more additional instrument coordinate systems using the unleveled optical total station; and determining the coordinates of the additional points in the local coordinate system using the transformations and the second transformation.

21. A method of stationing an unleveled optical total station, the method comprising:

determining positions of three or more non-collinear target points at each of a plurality of measurement stations using the unleveled optical total station, each measurement station being associated with a respective instrument coordinate system, where the three or more non-collinear target points at each measurement station are common with three or more non-collinear target points at another one of the plurality of measurement stations;

computing transformations such that the positions of the three or more non-collinear target points at each measurement station can be determined in a first one of the instrument coordinate systems;

determining positions of at least three non-collinear control points at one or more of the plurality of measurement stations;

determining the positions of the at least three non-collinear control points in the first one of the instrument coordinate systems using the transformations;

obtaining positions of the at least three non-collinear control points in the local coordinate system; and computing a second transformation between the first one of the instrument coordinate systems and the local coordinate system using the positions of the at least three non-collinear control points in the first one of the instrument coordinate systems and the positions of the at least three non-collinear control points in the local coordinate system.

* * * * *